United States Patent [19]
Watanabe et al.

[11] Patent Number: 5,478,617
[45] Date of Patent: Dec. 26, 1995

[54] MULTI-LAYER FILM AND CONTAINER

[75] Inventors: Katsushi Watanabe, Itano; Shigetoshi Kashiyama, Naruto, both of Japan

[73] Assignees: Otsuka Pharmaceutical Factory, Inc., Tokushima; Mitsui Petrochemical Industries, Ltd., Tokyo, both of Japan

[21] Appl. No.: 313,254

[22] PCT Filed: Feb. 2, 1994

[86] PCT No.: PCT/JP94/00144

§ 371 Date: Oct. 4, 1994

§ 102(e) Date: Oct. 4, 1994

[87] PCT Pub. No.: WO94/18000

PCT Pub. Date: Aug. 18, 1994

[30] Foreign Application Priority Data

Feb. 4, 1993 [JP] Japan .................................. 5-017744

[51] Int. Cl.⁶ .......................... B32B 27/32; B65D 65/40
[52] U.S. Cl. .......................... 428/35.2; 428/41; 428/218; 428/349; 428/516
[58] Field of Search ............................ 428/41, 516, 218, 428/349, 35.2

[56] References Cited

U.S. PATENT DOCUMENTS 4,961,495 10/1990 Yoshida et al. .

FOREIGN PATENT DOCUMENTS

| | | |
|---|---|---|
| 0095299 | 11/1983 | European Pat. Off. . |
| 0145945 | 6/1985 | European Pat. Off. . |
| 56-150777 | 11/1981 | Japan . |
| 59-142963 | 8/1984 | Japan . |
| 6422548 | 1/1989 | Japan . |
| 2-95849 | 4/1990 | Japan . |
| 2150442 | 8/1990 | Japan . |
| 3-39332 | 2/1991 | Japan . |
| 4-266759 | 9/1992 | Japan . |
| 2115348A | 9/1983 | United Kingdom . |
| 2216845A | 10/1989 | United Kingdom . |

Primary Examiner—P. C. Sluby
Attorney, Agent, or Firm—Sughrue, Mion, Zinn, Macpeak & Seas

[57] ABSTRACT

A multi-layer film is described having an outer layer containing a linear ethylene-α-olefin copolymer, an intermediate layer containing a linear ethylene-α-olefin copolymer, and an inner layer containing a resin in which a predetermined amount of polypropylene is contained in a linear ethylene-α-olefin copolymer, wherein each component has a predetermined density, respectively, and a predetermined amount of a high-density polyethylene is contained in all layers, and a container using the film. There is no fear of a decrease in sealing strength, deformation, deterioration of transparency, etc., even if sterilization is conducted at a temperature condition of not less than 120° C., and , furthermore, the easy peelable seal part is stable even if the film is molded into a container having a plurality of chambers. Therefore, the resulting container can be suitably used for an infusion bag, etc.

10 Claims, 1 Drawing Sheet

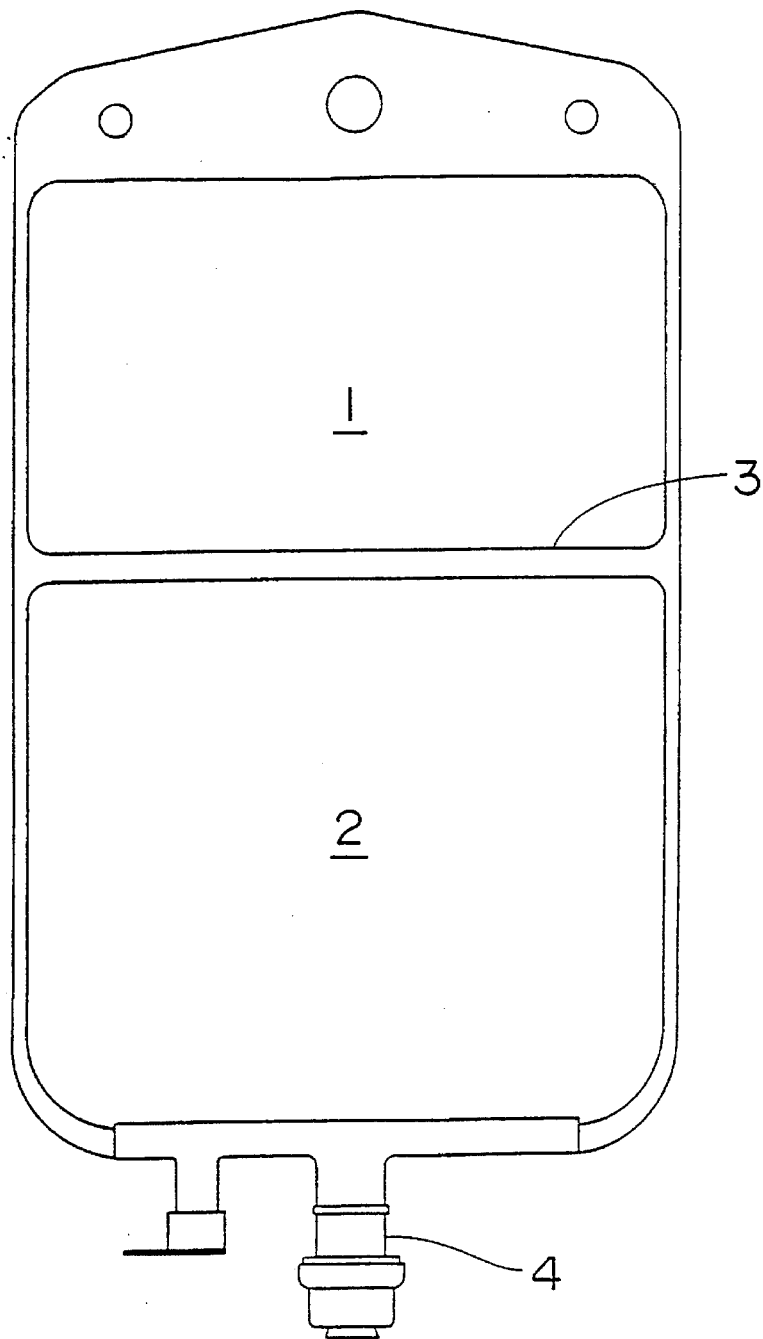
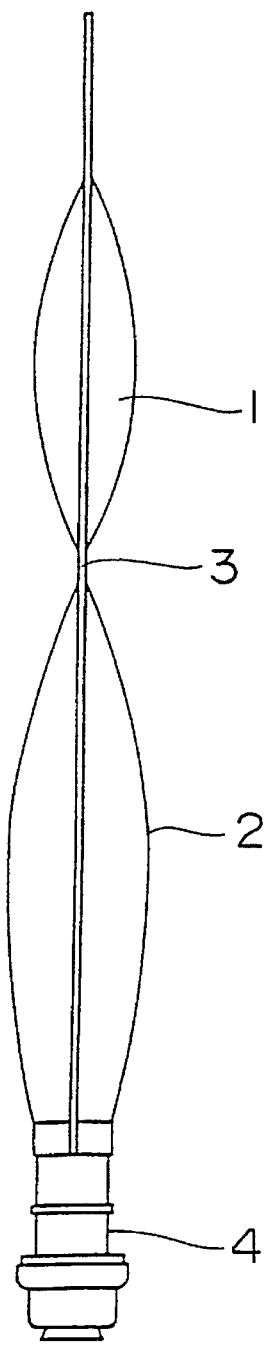

MULTI-LAYER FILM AND CONTAINER

TECHNICAL FIELD

The present invention relates to a multi-layer film and a container molded using the same. More particularly, it relates to a multi-layer film used for a container having a plurality of chambers which is suitably used for containing a liquid medicine, etc., in the medical field, said container being capable of separately containing two or more kinds of medicines and mixing such for use, and a container using the film.

BACKGROUND OF THE INVENTION

Heretofore, in medical plastic containers, various containers having a plurality of chambers have been studied so as to enable them to contain separately two or more kinds of medicines, e.g., amino acid solution and sugar electrolyte solution, antibiotic and liquid for dissolving the same, etc., to mix them aseptically on use. Examples thereof include a container wherein an easy peelable seal part is formed between two chambers using a resin mixture of polyethylene and polypropylene (Japanese Laid-Open Patent Publication No. 2-4671).

However, since heat resistance has not been sufficiently taken into consideration in the above container, sealing strength and drop-shock resistance are deteriorated by sterilization under high-temperature conditions such as high-pressure steam sterilization, hot-water sterilization, etc. Furthermore, deformation occurs and transparency and flexibility are deteriorated. Particularly, when the temperature condition of the sterilization is set at a severe condition, i.e. not less than 120° C., not only is strength drastically reduced but also serious failures such as deterioration of the easy peelable seal part occurs.

On the other hand, there has been proposed a medical bag having a three-layer structure wherein a resin composition composed of a radical-polymerized low-density polyethylene having a density of not more than 0.930 g/cm$^3$ and a high-density polyethylene having a density of not less than 0.945 g/cm$^3$ is used for inner and outer layers, respectively, and a resin composition composed of a linear low-density polyethylene having a density of not more than 0.920 g/cm$^3$ and a high-density polyethylene having a density of not less than 0.945 g/cm$^3$ are used as an intermediate layer (Japanese Laid-Open Patent Publication No. 4-266759) in order to improve heat resistance.

However, the above container does not have satisfactory heat resistance, and it has not been taken into consideration to provide an easy peelable seal part; therefore, it can not be used for a container having a plurality of chambers.

It is a main object of the present invention to provide a multi-layer film having heat resistance high enough to endure the high-temperature sterilization as described above, wherein an easy peelable seal part causes no weld by a sterilization treatment when it is used for a container having a plurality of chambers, and a container molded using the film.

It is an another object of the present invention to provide a multi-layer film having excellent strength, flexibility and transparency, and a container molded using the film.

DISCLOSURE OF THE INVENTION

According to the present invention, there is provided the following multi-layer film and container.

That is, the multi-layer film of the present invention is a multi-layer film composed of a polyolefin resin, comprising:

(1) an outer layer containing a linear ethylene-α-olefin copolymer having a density of 0.920 to 0.950 g/cm$^3$;

(2) an intermediate layer having at least one layer containing a linear ethylene-α-olefin copolymer having a density of not more than 0.920 g/cm$^3$; and (3) an inner layer containing a resin in which 20 to 40% by weight of polypropylene is contained in a linear ethylene-α-olefin copolymer having a density of not more than 0.940 g/cm$^3$;

wherein a high-density polyethylene having a density of not less than 0.960 g/cm$^3$ is contained in all layers, and the amount of the high-density polyethylene in the outer and intermediate layers is within a range of from 15 to 55% by weight, and that in the inner layer is within a range of from 5 to 50% by weight.

According to the preferred embodiment of the present invention, there is provided a multi-layer film wherein an inner layer is composed of a resin wherein 25 to 40% by weight of polypropylene is contained in a linear ethylene-α-olefin copolymer having a density of 0.920 to 0.940 g/cm$^3$ and a high-density polyethylene having a density of not less than 0,960 g/cm$^3$, the amount of the high-density polyethylene being within a range of from 5 to 20% by weight.

According to a more preferred embodiment of the present invention, there is provided a multi-layer film, comprising:

(1) an outer layer containing a linear ethylene-α-olefin copolymer having a density of 0.930 to 0.945 g/cm$^3$;

(2) an intermediate layer having at least one layer containing a linear ethylene-α-olefin copolymer having a density of 0.885 to 0.905 g/cm$^3$; and (3) an inner layer containing a resin in which from 20; to 40% by weight of polypropylene contained therein is in a linear ethylene-α-olefin copolymer having a density of 0.930 to 0.940 g/cm$^3$;

wherein a high-density polyethylene having a density of not less than 0.960 g/cm$^3$ is contained in all layers, and the amount of the high-density polyethylene in the outer and intermediate layers is within a range of from 15 to 55% by weight, and that in the inner layer is within a range of from 5 to 50% by weight.

According to a still more preferred embodiment of the present invention, there is provided a multi-layer film, which comprises:

(1) an outer layer containing a linear ethylene-α-olefin copolymer having a density of 0.940 g/cm$^3$;

(2) an intermediate layer having at least one layer containing a linear ethylene-α-olefin copolymer having a density of 0.905 g/cm$^3$ or 0.885 g/cm$^3$; and (3) an inner layer containing a resin in which from 20 to 40% by weight of polypropylene is contained in a linear ethylene-α-olefin copolymer having a density of 0.930 g/cm$^3$ or 0.940 g/cm$^3$;

wherein a high-density polyethylene having a density of not less than 0.960 g/cm$^3$ is contained in all layers, and the amount of the high-density polyethylene in the outer and intermediate layers is within a range of from 15 to 35% by weight, and that in the inner layer is within a range of from 5 to 20% by weight.

Examples of the embodiment of this multi-layer film include the following multi-layer films, comprising:

First Embodiment (1) an outer layer composed of a resin in which 20% by weight of a high-density polyethylene having a density of 0.965 g/cm$^3$ is contained in a linear ethylene-α-olefin copolymer having a density of 0.940 g/cm$^3$;

(2) an intermediate layer composed of a resin in which 30% by weight of a high-density polyethylene having a density of 0.965 g/cm$^3$ is contained in a linear ethylene-α-olefin copolymer having a density of 0.905 g/cm$^3$; and (3) an inner layer composed of a resin in which 20% by weight of a high-density polyethylene having a density of 0.965 g/cm$^3$ and 30% by weight of polypropylene having a density of 0.910 g/cm$^3$ are contained in a linear ethylene-α-olefin copolymer having a density of 0.930 g/cm$^3$;

Second Embodiment (1) an outer layer composed of a resin in which 20% by weight of a high-density polyethylene having a density of 0.965 g/cm$^3$ is contained in a linear ethylene-α-olefin copolymer having a density of 0.940 g/cm$^3$;

(2) an intermediate layer composed of a resin in which 30% by weight of a high-density polyethylene having a density of 0.965 g/cm$^3$ is contained in a linear ethylene-α-olefin copolymer having a density of 0.885 g/cm$^3$; and (3) an inner layer composed of a resin in which 14% by weight of a high-density polyethylene having a density of 0.965 g/cm$^3$ and 33% by weight of polypropylene having a density of 0.910 g/cm$^3$ are contained in a linear ethylene-solefin copolymer having a density of 0.940 g/cm$^3$; and

Third Embodiment (1) an outer layer composed of a resin in which 20% by weight of a high-density polyethylene having a density of 0.965 g/cm$^3$ is contained in a linear ethylene-α-olefin copolymer having a density of 0.940 g/cm$^3$;

(2) an intermediate layer composed of a first layer of a resin in which 30% by weight of a high-density polyethylene having a density of 0.965 g/cm$^3$ is contained in a linear ethylene-α-olefin copolymer having a density of 0.905 g/cm$^3$, a second layer of a resin in which 20% by weight of a high-density polyethylene having a density of 0.965 g/cm$^3$ is contained in a linear ethylene-α-olefin copolymer having a density of 0.930 g/cm$^3$ and a third layer of a resin wherein 30% by weight of a high-density polyethylene having a density of 0.965 g/cm$^3$ is contained in a linear ethylene-α-olefin copolymer having a density of 0.905 g/cm$^3$; the first layer, the second layer, and the third layer being laminated to each other in this order and (3) an inner layer composed of a resin in which 20% by weight of a high-density polyethylene having a density of 0.965 g/cm$^3$ and 30% by weight of polypropylene having a density of 0,910 g/cm$^3$ are contained in a linear ethylene-α-olefin copolymer having a density of 0.930 g/cm$^3$. Further, examples of the high-density polyethylene having a density of 0.965 g/cm$^3$ include those which have a melt flow rate of 15 g/10 minute (190° C.).

The container of the present invention is a container molded using film as described above, especially comprising two or more chambers, the respective chambers being partitioned by an easy peelable seal part formed by directly heat-sealing inner surfaces of the above films to each other.

BRIEF EXPLANATION OF DRAWINGS

FIG. 1 is a plan view illustrating the container having a plurality of chambers of the present invention.

FIG. 2 is a side view illustrating the container having a plurality of chambers of the present invention.

PREFERRED EMBODIMENTS OF THE INVENTION

The linear ethylene-a-olefin copolymer used for the film of the present invention is a linear structure resin having a short-chain branch which is obtained by copolymerizing ethylene with α-olefin as a main component by means of a low-pressure method. Examples of α-olefin include those having 3 to 12 carbon atoms, such as propylene, 1-1butene, 1-pentene, 1-hexene, 4-methyl-1-pentene, 1-heptene, 1-octene, 1-nonene, 1-decene, 1-undecene, 1-dodecene and the like. Among them, 1-butene and 4-methyl-1-pentene can be suitably used. A copolymer constituting each layer has the following properties, respectively.

Outer Layer

Since excellent mechanical strength and heat resistance are required in addition to transparency and flexibility, the density of the linear ethylene-α-olefin copolymer is selected within a range from 0.920 to 0.950 g/cm$^3$, and those having a density of 0.930 to 0.945 g/cm$^3$ are particularly preferred. It is preferred to use those having a melt flow rate (hereinafter referred to as "MFR") of 0.1 to 20 g/10 minutes, preferably 0.2 to 10 g/10 minutes, particularly 0.5 to 5 g/10 minutes. The outer layer is composed of a blend of this linear ethylene-α-olefin copolymer and a high-density polyethylene described later.

Intermediate Layer

It is necessary to use a resin having high flexibility, shock resistance and transparency, and a linear ethylene-α-olefin copolymer having a density of not more than 0.920 g/cm$^3$ is used. Preferred examples of the copolymer include those having a density of 0.880 to 0.920 g/cm$^3$, more preferably 0.885 to 0.915 g/cm$^3$, and particularly preferably 0.885 to 0,905 g/cm$^3$. Further, it is preferred to use those having an MFR of 0.1 to 20 g/10 minutes, more preferably 0.2 to 10 g/10 minutes, particularly preferably 0.5 to 5 g/10 minutes.

Further, the intermediate layer may be composed of one layer, but it can be molded into a multi-layer structure with the other kind of the linear ethylene-a-olefin copolymer. In that case, as the other copolymer, there can be used the same copolymer as that used for the inner layer described below. As a matter of course, the high-density polyethylene is contained in all layers. Further, the intermediate layer can also be molded into a multi-layer structure of layers containing a different amount of the high-density polyethylene.

Inner Layer

By using a resin in which 20 to 40% by weight, preferably 25 to 40% by weight of polypropylene is contained in a linear ethylene-α-olefin copolymer having a density of not more than 0.940 g/cm$^3$, the resulting layer can endure sterilization under a high-temperature condition. Further, by directly heat-sealing inner surfaces of the respective films to each other, an easily peelable seal part can be formed. It is preferred that the density of the linear ethylene-α-olefin copolymer is selected within a range from 0.920 to 0.940 g/cm$^3$, and those having a density of 0.930 to 0.940 g/cm$^3$ are particularly preferred. Further, it is preferred to use those having an MFR of 0.1 to 20 g/10 minutes, more preferably 0.2 to 10 g/10 minutes, particularly preferably 0.5 to 5 g/10 minutes. As the polypropylene, there may be contained a homopolymer, or a copolymer with a small amount of olefin such as ethylene, 1-butene, etc. (normally not more than 10 % by weight, preferably not more than 5% by weight). It is preferred to use those having an MFR of 0.1 to 60 g/10 minutes, more preferably 1.0 to 40 g/10 minutes, particularly preferably 1.5 to 25 g/10 minutes. The inner layer is composed of the above resin and a high-density polyethylene described below.

As the high-density polyethylene contained in the respective layers of the film of the present invention, there can be used a homopolymer of ethylene, or a copolymer with α-olefin such as 1-butene, 1-hexene, 4-methyl-1-pentene and the like. It is preferred to use those having a density of 0.960 to 0.970 g/cm$^3$ preferably those having MFR of 10 to 30 g/10 minutes. Among these high-density polyethylenes, those having Mw/Mn (Mw is a weight-average molecular weight determined by gel permeation chromatography (GPC) and Mn is a number-average molecular weight determined by GPC), which indicates molecular-weight distribution, of not more than is preferred, and 4.0 particularly not more than 3.5 is preferred, so as to maintain transparency of the film.

An amount of the high-density polyethylene is 15 to 55% by weight, and preferably 15 to 35% by weight, in the outer and intermediate layers. The amount is 5 to 50% by weight, and preferably 5 to 20% by weight, in the inner layer. When the amount is smaller than the above range, sufficient heat resistance can not be obtained. On the other hand, when the amount is larger than the above range, flexibility and transparency are deteriorated.

Regarding the multi-layer film formed by the above respective resin layers of the present invention, it is suitable for medical film that the total thickness is 100 to 700 μm, and preferably 150 to 300 μm. It is preferred that a ratio of a thickness of the respective layers (outer layer:intermediate layer:inner layer) is 5 to 30:90 to 40:5 to 30, more preferably 5 to 25:90 to 50:5 to 25, and still more preferably 5 to 20:90 to 60:5 to 20.

As a production process of the film of the present invention, there can be used a co-extrusion inflation process followed by water-cooling or air-cooling, a T-die co-extrusion method, a dry lamination method, a extrusion lamination method and the like. In view of properties, particularly transparency, economy, sanitation, a etc., co-extrusion inflation process followed by water-cooling and a T-die co-extrusion method are preferred. The condition of the above production process may be set to a suitable temperature, rate, etc., so as not to cause deterioration of the resin.

The container having a predetermined shape and size of the present invention can be produced by cutting a blown or flat film thus obtained by the above method, heat-sealing the film and providing it with an opening member by a means such as heat-sealing. Particularly, when a container having a plurality of chambers is produced, an easy peelable seal part between the respective chambers can be formed by heat-sealing under the mild condition in comparison with the heat-sealing condition of a peripheral edge part. Examples of the container having a plurality of chambers include that shown in FIG. 1 and FIG. 2. That is, a container having a plurality of chambers shown in FIG. 1 and FIG. 2 has two chambers 1, 2, and 10 these chambers 1, 2 are partitioned by an easy peelable seal part 3. The chamber 2 is provided with an opening member 4.

FIELD OF INDUSTRIAL APPLICABILITY

Regarding the multi-layer film and container of the present invention, sealing strength and drop-shock resistance are not decreased even if sterilization under a severe temperature condition, i.e. not less than 120° C., is conducted, and, further, no deformation occurs and transparency and flexibility are not deteriorated. Besides, when the container of the present invention is molded into a container having a plurality of chambers, the easy peelable seal part between the respective chambers can be formed by directly heat-sealing under a mild condition in comparison with the heat-sealing condition of the peripheral edge part. Therefore, a troublesome step of inserting an easy peelable tape between films is not required and it becomes easy to mold the container having a plurality of chambers. Further, regarding the container having a plurality of chambers thus obtained, the easy peelable seal part is stable after sterilization and medicines contained separately are not mixed with each other. Therefore, the resulting container can be suitably used as a medical container such as an infusion bag, etc.

EXAMPLES

The following Examples and Comparative Examples further illustrate the present invention in detail, but are hot to be construed to limit the scope thereof.

The respective resins will be shown by the following abbreviations. Further, MFR was determined by a method according to ASTM D 1238.

(1) HP: high-density polyethylene (ethylene-1-butene copolymer) [manufactured by MITSUI PETROCHEMICAL INDUSTRIES, LTD., density: 0.965 g/cm$^3$ MFR: 15 g/10 minutes (190 ° C.), Mw/Mn: 2.8]

(2) PE①: linear moderate-density polyethylene (ethylene-1-butene copolymer) [manufactured by MITSUI PETROCHEMICAL INDUSTRIES, LTD., density: 0.940 g/cm$^3$, MFR: 2.1 g/10 minutes (190° C.)]

(3) PE②: linear low-density polyethylene (ethylene-1-butene copolymer) [manufactured by MITSUI PETROCHEMICAL INDUSTRIES, LTD., density: 0.905 g/cm$^3$, MFR: 1.4 g/10 minutes (190° C.)]

(4) PE④: linear low-density polyethylene (ethylene-1-butene copclymer) [manufactured by ,MITSUI PETROCHEMICAL INDUSTRIES, LTD., density: 0.895 g/cm$^3$, MFR: 1.0 g/10 minutes (190° C.)]

(5) PE⑤: linear moderate-density polyethylene (ethylene-1-butene copclymer) [manufactured by MITSUI PETROCHEMICAL INDUSTRIES, LTD., density: 0.930 g/cm$^3$, MFR: 2.1 g/10 minutes (190° C.)]

(6) PE⑤: linear low-density polyethylene (ethylene-1-butene copolymer) [manufactured by MITSUI PETROCHEMICAL INDUSTRIES, LTD., density: 0.885 g/cm$^3$, MFR: 5.0 g/10 minutes (190° C.)]

(7) PP①: isotactic polypropylene [manufactured by MITSUI PETROCHEMICAL INDUSTRIES, LTD., density: 0.910 g/cm$^3$, MFR: 7.1 g/10 minutes (230° C.)]

(8) PP②: isotactic polypropylene [manufactured by MITSUI PETROCHEMICAL INDUSTRIES, LTD., density: 0.910 g/cm$^3$, MFR: 3.0 g/10 minutes (230° C.)]

Firstly, the respective laminating sheets (synthetic resin to be used and construction of layer are as shown in Table 1) were produced by means of a water-cooling co-extrusion inflation process followed water-cooling. Then, a 500 ml medical bag having two chambers as shown in FIG. 1 and FIG. 2 was molded using the respective laminating sheet.

The heat-sealing condition at the time of molding was set to a temperature of 180° C. for 4 seconds at the peripheral edge part of the bag, and a temperature of 140° C. for 3 seconds at the easily peelable seal part.

In Table 1, for example, the outer layer of Example 1 means a layer having a thickness of 15 μm obtained by mixing PE① with HP in a weight ratio (PE①/ HP=80/20).

TABLE 1

|  | Outer layer (μm) | Intermediate layer (μm) | | | Inner layer (μm) |
|---|---|---|---|---|---|
| Example 1 | PE① + HP 80:20 (15) | | PE② + HP 70:30 (170) | | PE④ + HP + PP① 50:20:30 (15) |
| Example 2 | PE① + HP 80:20 (15) | | PE③ + HP 50:50 (170) | | PE④ + HP + PP① 50:20:30 (15) |
| Example 3 | PEM① + HP 80:20 (15) | PE② + HP 80:20 (80) | PE④ + HP 80:20 (10) | PE② + HP 80:20 (80) | PE④ + HP + PP① 50:20:30 (15) |
| Example 4 | PE① + HP 80:20 (15) | PE② + HP 70:30 (80) | PE④ + HP 80:20 (10) | PE② + HP 70:30 (80) | PE④ + HP + PP① 50:20:30 (15) |
| Example 5 | PE① + HP 80:20 (15) | PE③ + HP 50:50 (80) | PE④ + HP 80:20 (10) | PE③ + HP 50:50 (80) | PE④ + HP + PP① 50:20:30 (15) |
| Example 6 | PE① + HP 80:20 (30) | | PE⑤ + HP 80:20 (115) | | PE① + HP + PP② 60:7:33 (30) |
| Example 7 | PE① + HP 80:20 (30) | | PE⑤ + HP 70:30 (115) | | PE① + HP + PP② 53:14:33 (30) |
| Example 8 | PE① + HP 80:20 (15) | PE⑤ + HP 70:30 (60) | PE⑤ + HP 50:50 (10) | PE⑤ + HP 70:30 (60) | PE① + HP + PP② 53:14:33 (30) |
| Comp. Ex. 1 | PE① + HP 90:10 (15) | PE② + HP 90:10 (80) | PE④ + HP 90:10 (10) | PE② + HP 90:10 (80) | PE④ + HP + PP① 60:10:30 (15) |
| Comp. Ex. 2 | PE① + HP 80:20 (15) | PE② (80) | PE④ (10) | PE② (80) | PE④ + HP + PP① 50:20:30 (15) |
| Comp. Ex. 3 | PE① (15) | PE② + HP 90:10 (80) | PE④ + HP 90:10 (10) | PE② + HP 90:10 (80) | PE④ + PP① 70:30 (15) |

The medical container thus obtained was filled with water and subjected to a high-pressure steam sterilization treatment at 121° C. for 30 minutes. Then, the state of deformation, breakage, wrinkling and blocking was examined by visual observation, and the results were taken as an index of heat resistance. Similarly, a cloudy state of the container was examined and the results were taken as an index of transparency. In addition, natural discharging properties of the content solution were examined by visual observation and the results were taken as an index of flexibility. Further, a state of heat-sealing of the peripheral edge part and the easily peelable seal part of the medical container before and after sterilization treatment were observed visually and the resulting heat-sealing states were taken as an index of sealing properties. Furthermore, an overall judgment was conducted according to these all indices. The results are shown in Table 2.

In Table 2, the symbol "⊙" indicates "very good", "○" indicates "good", "x" indicates "inferior" and "—" indicates "impossible to measure". As apparent from Table 2, the film and container of the present invention can endure high-temperature sterilization sufficiently, and its strength, flexibility and transparency are maintained.

TABLE 2

|  | Heat resistance | Flexibility | Transparency | Sealing properties | Judgement |
|---|---|---|---|---|---|
| Example 1 | ⊙ | ⊙ | ⊙ | ⊙ | ⊙ |
| Example 2 | ⊙ | ⊙ | ⊙ | ⊙ | ⊙ |
| Example 3 | ○ | ○ | ○ | ○ | ○ |
| Example 4 | ⊙ | ⊙ | ⊙ | ⊙ | ⊙ |
| Example 5 | ⊙ | ⊙ | ⊙ | ⊙ | ⊙ |
| Example 6 | ⊙ | ⊙ | ⊙ | ⊙ | ⊙ |
| Example 7 | ⊙ | ⊙ | ⊙ | ⊙ | ⊙ |
| Example 8 | ⊙ | ⊙ | ⊙ | ⊙ | ⊙ |
| Comp. Ex. 1 | x | x | x | x | x |
| Comp. Ex. 2 | x | — | — | x | x |
| Comp. Ex. 3 | x | — | — | x | x |

We claim:

1. A multi-layer film composed of a polyolefin resin, comprising:

(1) an outer layer containing a linear ethylene-α-olefin copolymer having a density of 0.920 to 0.950 g/cm$^3$;

(2) an intermediate layer having at least one layer containing a linear ethylene-α-olefin copolymer having a density of not more than 0.920 g/cm$^3$; and (3) an inner layer containing a resin in which 20 to 40% by weight of polypropylene is contained in a linear ethylene-α-olefin copolymer having a density of not more than 0.940 g/cm$^3$;

wherein a high-density polyethylene having a density of not less than 0.960 g/cm$^3$ is contained in all layers, and an amount of the high-density polyethylene in the outer and intermediate layer is within a range from 15 to 55% by weight and that in the inner layer is within a range from 5 to 50% by weight.

2. The multi-layer film according to claim 1, wherein the inner layer is composed of a resin in which 25 to 40% by weight of polypropylene is contained in a linear ethylene-α-olefin copolymer having a density of 0.920 to 0.940 g/cm$^3$ and a high-density polyethylene having a density of not less than 0.960 g/cm$^3$ and the amount of the high-density polyethylene is within a range from 5 to 20% by weight.

3. A multi-layer film composed of a polyolefin resin, comprising:

(1) an outer layer containing a linear ethylene-α-olefin copolymer having a density of 0.930 to 0.945 g/cm$^3$;

(2) an intermediate layer having at least one layer containing a linear ethylene-α-olefin copolymer having a density of 0.885 to 0.905 g/cm$^3$; and (3) an inner layer containing a resin in which 20 to 40% by weight of polypropylene is contained in a linear ethylene-α-olefin copolymer having a density of 0.930 to 0.940 g/cm$^3$;

wherein a high-density polyethylene having a density of not less than 0.960 g/cm$^3$ is contained in all layers, and the amount of the high-density polyethylene in the outer and intermediate layers is within a range from 15 to 55% by weight and that in the inner layer is within a range from 5 to 50% by weight.

4. A multi-layer film composed of a polyolefin resin, comprising:

(1) an outer layer containing a linear ethylene-α-α-olefin copolymer having a density of 0.940 g/cm$^3$;

(2) an intermediate layer having at least one layer containing a linear ethylene-α-olefin copolymer having a density of 0.905 g/cm$^3$ or 0.885 g/cm$^3$; and (3) an inner layer containing a resin in which 20 to 40% by weight of polypropylene is contained in a linear ethylene-α-olefin copolymer having a density of 0.930 g/cm$^3$ or 0.940 g/cm$^3$;

wherein a high-density polyethylene having a density of not less than 0.960 g/cm$^3$ is contained in all layers, and the amount of the high-density polyethylene in the outer and intermediate layers is within a range from 15 to 35% by weight and that in the inner layer is within a range from 5 to 20% by weight.

5. The multi-layer film according to claim 4, wherein the outer layer is composed of a resin in which 20% by weight of a high-density polyethylene having a density of 0.965 g/cm$^3$ is contained in a linear ethylene-α-olefin copolymer having a density of 0.940 g/cm$^3$;

the intermediate layer is composed of a resin in which 30% by weight of a high-density polyethylene having a density of 0.965 g/cm$^3$ is contained in a linear ethylene-α-olefin copolymer having a density of 0.905 g/cm$^3$; and the inner layer is composed of a resin in which 20% by weight of a high-density polyethylene having a density of 0.965 g/cm$^3$ and 30% by weight of polypropylene having a density of 0.910 g/cm$^3$ are contained in a linear ethylene-α-olefin copolymer having a density of 0.930 g/cm$^3$.

6. The multi-layer film according to claim 4, wherein the outer layer is composed of a resin in which 20% by weight of a high-density polyethylene having a density of 0.965 g/cm$^3$ is contained in a linear ethylene-α-olefin copolymer having a density of 0.940 g/cm$^3$;

the intermediate layer is composed of a resin in which 30% by weight of a high-density polyethylene having a density of 0.965 g/cm$^3$ is contained in a linear ethylene-α-olefin copolymer having a density of 0.885 g/cm$^3$; and the inner layer is composed of a resin in which 14% by weight of a high-density polyethylene having a density of 0.965 g/cm$^3$ and 33% by weight of polypropylene having a density of 0.910 g/cm$^3$ are contained in a linear ethylene-α-olefin copolymer having a density of 0.940 g/cm$^3$.

7. The multi-layer film according to claim 4, wherein the outer layer is composed of a resin in which 20% by weight of a high-density polyethylene having a density of 0.965 g/cm$^3$ is contained in a linear ethylene-α-olefin copolymer having a density of 0.940 g/cm$^3$;

the intermediate layer is composed of a first layer of a resin in which 30% by weight of a high-density polyethylene having a density of 0.965 g/cm$^3$ is contained in a linear ethylene-α-olefin copolymer having a density of 0.905 g/cm$^3$, a second layer of a resin in which 20% by weight of a high-density polyethylene having a density of 0.965 g/cm$^3$ is contained in a linear ethylene-α-olefin copolymer having a density of 0.930 g/cm$^3$ and a third layer of a resin in which 30% by weight of a high-density polyethylene having a density of 0.965 g/cm$^3$ is contained in a linear ethylene-α-olefin copolymer having a density of 0.905 g/cm$^3$ the first layer the second layer and the third layer being laminated to each other in this order; and the inner layer is composed of a resin in which 20% by weight of a high-density polyethylene having a density of 0.965 g/cm$^3$ and 30% by weight of polypropylene having a density of 0.910 g/cm$^3$ are contained in a linear ethylene-α-solefin copolymer having a density of 0.930 g/cm$^3$.

8. The multi-layer film according to claim 5, wherein the high-density polyethylene having a density of 0.965 g/cm$^3$ has a melt flow rate of 15 g/10 minute (190° C.).

9. A container molded using the film according to claims 1, 2, 3, 4, 5, 6, 7 or 8.

10. A container comprising two or more chambers, which is molded using the film according to claims 1, 2, 3, 4, 5, 6, 7 or 8, the respective chambers being partitioned by any easy peelable seal part formed by directly heat-sealing inner surfaces of the above films to each other.

* * * * *